United States Patent
Smith et al.

(10) Patent No.: US 8,416,246 B2
(45) Date of Patent: *Apr. 9, 2013

(54) GENERATING A SURFACE REPRESENTATION OF AN ITEM

(75) Inventors: Jason Smith, San Rafael, CA (US); Frederic P. Pighin, San Francisco, CA (US); Cary Phillips, Moss Beach, CA (US)

(73) Assignee: Lucasfilm Entertainment Company Ltd., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/467,428

(22) Filed: May 9, 2012

(65) Prior Publication Data

US 2012/0218286 A1    Aug. 30, 2012

Related U.S. Application Data

(63) Continuation of application No. 12/038,171, filed on Feb. 27, 2008, now Pat. No. 8,194,080.

(60) Provisional application No. 60/940,935, filed on May 30, 2007.

(51) Int. Cl.
*G06T 15/00*    (2011.01)
(52) U.S. Cl. ......... 345/473; 345/419; 345/474; 345/475
(58) Field of Classification Search ............... 345/419, 345/473, 474, 475
See application file for complete search history.

(56) References Cited

U.S. PATENT DOCUMENTS

| | | | |
|---|---|---|---|
| 5,966,141 A | 10/1999 | Ito et al. | |
| 6,326,972 B1 | 12/2001 | Buhler et al. | |
| 6,400,368 B1 | 6/2002 | Laperriere | |
| 6,535,215 B1 | 3/2003 | DeWitt et al. | |

OTHER PUBLICATIONS

Mohr, Alex, Tokheim, Luke, and Gleicher, Michael, 'Direct Manipulation of Interactive Character Skins', published on Mar. 16, 2007, University of Wisconsin, 4 pages.

'Skeletal Animation' [online], Wikipedia, [published on Oct. 11, 2006], [retrieved on Jul. 6, 2009], Retrieved from the internet: http://web.archive.org/web/20061011232200/http://en.wikipedia.org/wiki/skeletal_animation.

Rose, Charles, Bodenheimer, Bobby, and Cohen, Michael F., 'Verbs and Adverbs: Multidimensional Motion Interpolation Using Radial Basis Function', Microsoft Research, published Sep. 20, 2007, 17 pages.

*Primary Examiner* — Kimbinh T Nguyen
(74) *Attorney, Agent, or Firm* — Fish & Richardson P.C.

(57) ABSTRACT

Among other disclosed subject matter, a computer-implemented method for generating a surface representation of an item includes identifying, for a point on an item in an animation process, at least first and second transformation points corresponding to respective first and second transformations of the point. Each of the first and second transformations represents an influence on a location of the point of respective first and second joints associated with the item. The method includes determining an axis for a cylindrical coordinate system using the first and second transformations. The method includes performing an interpolation of the first and second transformation points in the cylindrical coordinate system to obtain an interpolated point. The method includes recording the interpolated point in a surface representation of the item in the animation process.

18 Claims, 4 Drawing Sheets

GENERATING A SURFACE REPRESENTATION OF AN ITEM

CROSS-REFERENCE TO RELATED APPLICATIONS

This application is a continuation of and claims priority under 35 U.S.C. §120 to U.S. application Ser. No. 12/038,171, filed Feb. 27, 2008, and entitled "Generating a Surface Representation of an Item" which claims priority to U.S. Provisional Application No. 60/940,935, filed May 30, 2007, entitled "Generating Animation in a Three-Dimensional Representation", the entire contents of which are hereby incorporated by reference.

TECHNICAL FIELD

This document relates to generating a surface representation of an item.

BACKGROUND

In animation processes, characters can be represented using geometric elements that are caused to undergo the desired motion of the character. A geometric element, such as a limb, has a surface representation that is to be the basis for the image of the character that is later generated in a rendering process. Various processing is performed to generate the surface representation and to subsequently subject it to the character's movement.

Characters in an animated motion picture are sometimes provided with unnatural abilities or features, such as them being impervious to injury or having unlimited strength. Viewers typically accept this as legitimate exercises of artistic freedom, perhaps because it is apparent that it is a direct outflow of the artist's or creator's imagination. In other respects, however, it is desirable or necessary that animated characters behave more naturally. This can include, but is not limited to, the appearance and behavior of the character's body, clothing and other items. That is, if a character has arms and legs viewers will often expect that these should behave more or less as on a real human (or other animal the character is based on). Particularly, it can be important to provide a natural appearance when various parts of the character are in motion and/or change shape due to movement.

SUMMARY

The invention relates to generating a surface representation of an item.

In a first aspect, a computer-implemented method for generating a surface representation of an item includes identifying, for a point on an item in an animation process, at least first and second transformation points corresponding to respective first and second transformations of the point. Each of the first and second transformations represents an influence on a location of the point of respective first and second joints associated with the item. The method includes determining an axis for a cylindrical coordinate system using the first and second transformations. The method includes performing an interpolation of the first and second transformation points in the cylindrical coordinate system to obtain an interpolated point. The method includes recording the interpolated point in a surface representation of the item in the animation process.

Implementations can include any, all or none of the following features. Determining the axis can include estimating a composite effect of the first and second transformations. The estimation can include determining a rigid transformation as an approximation of: (i) the second transformation, and (ii) an inverse of the first transformation, wherein the rigid transformation is used in determining the axis. Determining the axis can further include determining a direction of the axis by identifying an invariant of the rigid transformation. The invariant can be identified using a closed form formula. Determining the axis can further include estimating a point on the axis. Estimating the point can include determining a closest point on the axis to an origin. Determining the closest point can include computing a minimum norm solution. Performing the interpolation can include evaluating:

$$Env(p)=c+(\alpha lA+\beta lB)\underline{u}+(\alpha rA+\beta rA)(\cos(\alpha\phi A+\beta\phi A)\underline{u}+\sin(\alpha\phi A+\beta\phi A)\underline{w})$$

The method can further include blending (i) the interpolated point with (ii) a linear blending of the first and second transformations. The blending can include evaluating a difference vector (d) as:

$$\underline{d} = aOn_i \times aOn_j \times \left(Env(p) - \frac{LinEnv(p)}{w_i + w_j}\right)$$

wherein
$w_i$ is a linear blending weight for joint i
$w_j$ is a linear blending weight for joint j
$aOn_i$ is an amount of cylindrical interpolation for joint i
$aOn_j$ is an amount of cylindrical interpolation for joint j.

The point on the item can be affected by more than two joints, including the first and second joints, and the blending can further include repeating the transformation points identification, the axis determination and the interpolation performance for each of the more than two joints; and obtaining a blended result thereof using weights. Obtaining the blended result can include enforcing that any joint pair that has zero displacement vector or angle does not make any contribution to the interpolated effects. Obtaining the blended result can include enforcing that any joint pair where either joint has no linear influence on the point in the item does not make any contribution to the interpolated effects. Obtaining the blended result can include scaling a contribution of the interpolated effects to the blended result proportional to an amount of linear blending. The blended result can be obtained by evaluating:

$$\underline{d} = \sum_{(i,j)\in J(p)} W_{i,j} d_{i,j}$$

wherein $$W_{i,j} = \frac{\omega_{i,j}}{\sum_{(k,l)\in J(p)} \omega_{k,l}} \times (w_i + w_j)$$

$$\omega_{i,j} = \|d_{i,j}\| \times \theta_{i,j} \times AGW_i \times AGW_j \times w_i \times w_j$$

wherein
$AGW_i$ is a weight for joint i
$AGW_j$ is a weight for joint j.

In a second aspect, a computer program product is tangibly embodied in a computer-readable medium and includes instructions that when executed by a processor perform a method for generating a surface representation of an item. The method includes identifying, for a point on an item in an animation process, at least first and second transformation points corresponding to respective first and second transformations of the point. Each of the first and second transformations represents an influence on a location of the point of respective first and second joints associated with the item. The method includes determining an axis for a cylindrical coordinate system using the first and second transformations. The method includes performing an interpolation of the first and second transformation points in the cylindrical coordinate system to obtain an interpolated point. The method includes recording the interpolated point in a surface representation of the item in the animation process.

Implementations can provide any, all or none of the following advantages. A more realistic appearance of a computer-generated character can be provided. An appearance of an object affected by one or more transformations can be improved. A surface representation of an object affected by at least two joints can be improved.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
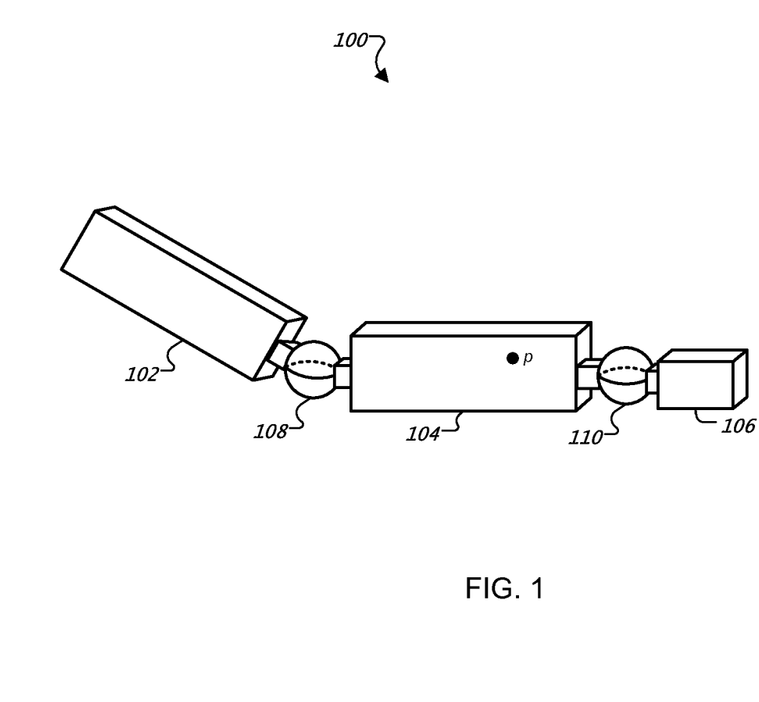
FIG. 1 is a block diagram of three-dimensional geometry.

FIG. 1 is a block diagram of three-dimensional geometry 100. Three-dimensional geometry can be used to represent objects in video games and movies, to name two examples. For example, the three-dimensional geometry 100 can represent a limb of a character. Such a limb can be manipulated through one or more animation sequences and rendered in one or more animation processes, such as an animation pipeline, that are otherwise known in the art. Typically, the geometry and the animations are generated by an artist. In general, the artist first constructs the geometry and then uses control points (e.g., joints) to manipulate the geometry to construct appropriate animations.

As the three-dimensional geometry 100 moves, so too should a surface representation associated with the geometry 100. For example, a skin texture that is applied to the three-dimensional geometry 100 can move based on the motion of the underlying geometry 100. Movement in a three-dimensional space can be defined by a series of transformations. Linear transformations (e.g., rigid transformations) can be represented by one or more matrices. For a rigid transformation, a matrix specifies a rotation transformation (i.e., the object is rotating in the three-dimensional space), a translation transformation (i.e., the object is moving in the three-dimensional space), or both. When applied to the three-dimensional geometry 100, the transformations manipulate each point in the surface representation associated with the three-dimensional geometry 100. For example, if a portion of the three-dimensional geometry 100 is rotated along the x-axis, all of the points in the surface representation corresponding to the portion of the three-dimensional geometry that is rotated, will also rotate. Examples of rigid transformations are described in more detail below.

The three-dimensional geometry 100 has here been divided into portions 102, 104, and 106, respectively. For example, portion 102 can represent the upper arm of a limb, portion 104 can represent the forearm of the limb, and portion 106 can represent the hand of the limb. Each portion 102, 104, and 106 is connected by at least one joint. For example, portion 102 and 104 are connected by a first joint 108 and portion 104 and 106 are connected by a second joint 110. The first and second joints 108 and 110 can be used to manipulate various portions of the three-dimensional geometry 100. For example, joint 110 can rotate which, depending on the axis of rotation, can in-turn rotate portion 106, translate portion 106, or both.

Because portion 104 is connected to both the first joint 108 and the second joint 110, its location and orientation is influenced by both joints. It follows that the portion 104 can be manipulated by both the first joint 108 and the second joint 110. For example, consider a point p that is associated with a surface representation on the geometry of portion 104. If both the first joint 108 and the second joint 110 rotate, each joint will impart some contributing portion of the one or more transformations to the location of point p.

In some implementations, linear blending (i.e., linear enveloping or linear interpolation) can be used to approximate the contributions to the location of point p from the first joint 108 and the second joint 110. For example, consider matrices A and B that are associated with the first joint and second joint, respectively. The matrices A and B are configured to map a local coordinate system into world coordinates. In other words, each of matrices A and B describes a transformation. In general, matrices A and B are rigid transformations, sometimes with scaling. A rigid transformation maintains the distance between one or more points. For example, consider two points, point p and q (not shown) and assume that the transformations A and B are applied to them. If the distance between the points is the same after applying matrices A and B to both point p and point q, then the matrices A and B are said to be rigid transformations. In addition, the contribution imparted on point p by each matrix A and B can be scaled by weights $\alpha$ and $\beta$, respectively, to moderate the amount of influence of the respective transformation. The linear blended result of the weighted transformation matrices A and B can be defined by the following formula:

$LinEnv(p) = \alpha Ap + \beta Bp$ or represented another way:

$LinEnv(p) = (\alpha A + \beta B)p$

However, in some situations, linear blending can cause visual artifacts. For example, consider a joint that is oriented along an x-axis. Matrices A and B can then have the following form:

$$A = \begin{bmatrix} 1 & 0 & 0 & 0 \\ 0 & 1 & 0 & 0 \\ 0 & 0 & 1 & 0 \end{bmatrix}$$

$$B = \begin{bmatrix} 1 & 0 & 0 & 1 \\ 0 & \cos\theta & \sin\theta & 0 \\ 0 & -\sin\theta & \cos\theta & 0 \end{bmatrix}$$

where $\theta$ is the angle of rotation along the x-axis. If the total contribution from both matrices is 100 percent of the influence on the location of point p (i.e., $\alpha + \beta = 1$), then:

$$\alpha A+\beta B=\begin{bmatrix}1 & 0 & 0 & \beta\\0 & \alpha+\cos\theta & \beta\sin\theta & 0\\0 & -\beta\sin\theta & \alpha+\beta\cos\theta & 0\end{bmatrix}$$

Rotating this joint with an angle of $\pi$ yields:

$$\alpha A+\beta B=\begin{bmatrix}1 & 0 & 0 & \beta\\0 & \alpha-\beta & 0 & 0\\0 & 0 & \alpha-\beta & 0\end{bmatrix}$$

In portions of the geometry where $\alpha$ is substantially similar to $\beta$ the matrix can be further reduced to:

$$\alpha A+\beta B\approx\begin{bmatrix}1 & 0 & 0 & \beta\\0 & 0 & 0 & 0\\0 & 0 & 0 & 0\end{bmatrix}$$

which is a rank-1 matrix that maps three-dimensional space onto a line.

More generally, linearly blended transformations where $\alpha$ is substantially similar to $\beta$ can tend to collapse onto a line or single point. This can cause a loss of volume in linearly blended geometry. To avoid this and other visual artifacts, a non-linearly blended approach, such as cylindrical blending (i.e., cylindrical enveloping or cylindrical interpolation), can be used. To generate a surface representation using cylindrical blending, a cylindrical coordinate system can be defined.

Figure 2:
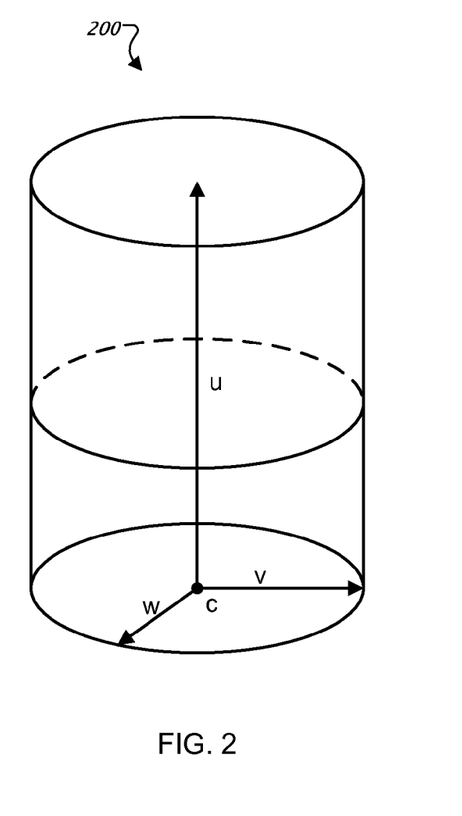
FIG. 2 is a block diagram of a cylindrical coordinate system.

FIG. 2 is a block diagram of a cylindrical coordinate system 200. Assuming a cylindrical axis u has been estimated, the cylindrical coordinate system 200 is defined by $(c, \underline{u}, \underline{v}, \underline{w})$ where c is the origin of the cylindrical axis u and v and w are chosen to form an orthogonal basis. The cylinder can be estimated by considering the transformation $BA^{-1}$.

This transformation summarizes the composite effects of the two joints. In other words, $BA^{-1}$ represents the effect that B has on point p in the surface representation, as seen from A. In general, $BA^{-1}$ can be approximated by a rigid transformation and the axis of rotation of the rigid transformation can be used as the cylinder's axis (i.e., u). For example, $BA^{-1}$ can be approximated by a rigid transformation (R|t), where R defines a rotation matrix, and t defines an axis of rotation for R.

Using the rigid transformation (R|t), (c, u) can be estimated because the direction of the axis, u, is an invariant of the rotation R (i.e., Ru=u). In other words, u is the eigenvector of R associated with the eigenvalue of one and can be computed using a closed form formula. For example, in some implementations, the eigenvector can be computed using power iteration. In general, power iteration uses an iterative algorithm to converge on an eigenvalue (e.g., the eigenvalue with the largest absolute value). As another example, a matrix factorization algorithm such as singular value decomposition (SVD) can be used. In general, SVD separates a matrix into two or more factors (e.g., one or more matrices corresponding to a set of input basis vectors a set of output basis vectors and a scalar component) where the factors correspond to the eigenvalues and/or eigenvectors. Matrix factorization can provide better computational performance on smaller matrices (e.g., the matrix R) and as such, SVD may be preferred over power iteration for extracting eigenvalues and/or eigenvectors.

Once the axis u is determined, the point c on the rotational axis can also be estimated. For example, if the rigid transformation (R|t) is applied to the point p, the point p is translated by part of the translation parallel to the rotation axis. Solving for c can be computed by the following formula:

$(R|t)c=c+(t\cdot\underline{u})\underline{u}$ which can be rearranged as:

$(I-R)c=t-(t\cdot\underline{u})\underline{u}$ where I is the identity matrix. Because Ru=u, I−R is rank defective. In other words, any point along the axis u can be a solution for c. A minimum norm solution (i.e., the closest point to the origin) can be computed for c using a variety of methods. For example, an SVD, a pseudo-inverse, or a closed-form solution can be used to determine c.

Figure 3:
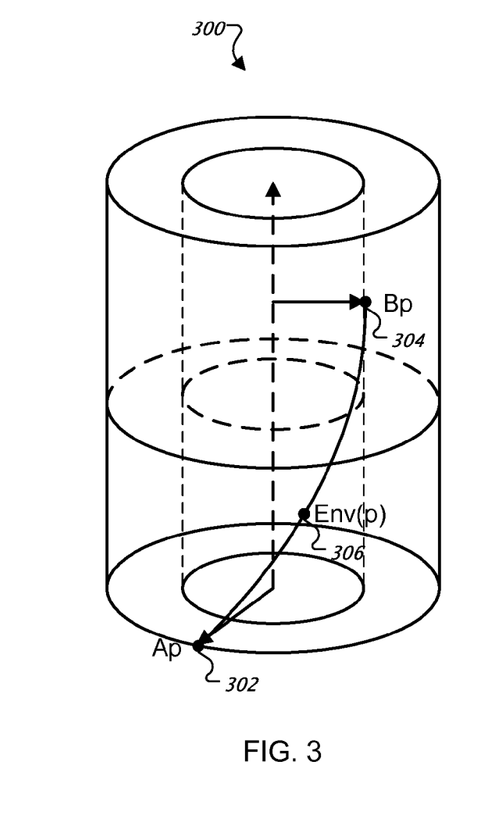
FIG. 3 is a block diagram of a cylindrical interpolation.

FIG. 3 is a block diagram showing a cylindrical interpolation 300. Cylindrical interpolation can be used to compute transformations that are close to rigid transformation, regardless of their weights, for a given pair of joints, where the joints are rotated around the same axis. In other words, instead of merely blending Ap 302 and Bp 304 linearly (i.e., in a line), cylindrical interpolation blends Ap 302 and Bp 304 between the respective curves of the cylinders defined by the transformations in the cylindrical coordinate system 200. For example, using the cylindrical coordinate system 200, Ap 302 and Bp 304 can be expressed the by following formulas:

$Ap=c+l_A\underline{u}+r_A(\cos\phi_A+\sin\phi_A\underline{w})$ and $Bp=c+l_B\underline{u}+r_B(\cos\phi_B+\sin\phi_B\underline{w})$ where $l_A$ and $l_B$ are coordinates along the axis u, $r_A$ and $r_B$ are coordinates perpendicular to the axis u, and $\phi_A$ and $\phi_B$ are the angles between $l_A$ and $r_A$ and $l_B$ and $r_B$ around the axis u for transformations A and B, respectively. Using cylindrical interpolation, and using the above formulas for Ap 302 and Bp 304, the location of point Env(p) 306 in the surface representation can be determined using the following formula:

$$Env(p)=c+(\alpha l_A+\beta l_B)\underline{u}+(\alpha r_A+\beta r_A)(\cos(\alpha\phi_A+\beta\phi_A)\underline{u}+\sin(\alpha\phi_A+\beta\phi_A)\underline{w}) \quad (1)$$

For example, consider the transformations A and B described above in reference to FIG. 1. Because the axis of rotation is the x-axis, the axis of the cylinder (i.e., (c, u)) can be defined as ((0,0,0),(1,0,0)), or in other words, beginning at the origin (0,0,0) and traveling along the positive x-axis. In this case, the location of point p can be represented by the following formula:

$p=(x,y,z)=(x,\sqrt{y^2+z^2}\cos\phi,\sqrt{y^2+z^2}\sin\phi)$

Using the definition of p, Env(p) can be represented by the following formula:

$Env(p)=x\underline{x}+\sqrt{y^2+z^2}\cos(\phi+\beta\theta)\underline{y}+\sqrt{y^2+z^2}\sin(\phi+\beta\theta)\underline{z}$ This can be reduced to:

$$Env(p)=\begin{bmatrix}1 & 0 & 0 & 0\\0 & \cos(\beta\theta) & \sin(\beta\theta) & 0\\0 & -\sin(\beta\theta) & \cos(\beta\theta) & 0\end{bmatrix}p$$

In other words, the cylindrical enveloping is a rotation of angle $\beta\theta$ along the x-axis, which maintains the volume of the original three-dimensional geometry.

In addition to applying a purely cylindrical interpolation of the first and second transformations A and B, the cylindrical interpolation can be further blended with a linear interpolation of the first and second transformation A and B. In general, additional weights can be applied to the blending of the cylindrical interpolation with the linear interpolation. For example, a displacement to the location of point p can be determined using the following formula:

$$d = aOn_i \times aOn_j \times \left(Env(p) - \frac{LinEnv(p)}{w_i + w_j}\right)$$

where $w_i$ is the linear blended weight for joint i (e.g., α), $w_j$ is the linear blended for joint j (e.g., β), $aOn_i$ is the amount of cylindrical blending for joint i, and $aOn_j$ is the amount of cylindrical blending for joint j.

In some implementations, more than two joints can influence the location of a single point in a surface representation. In such cases, the displacement can be calculated in pairs, and the results blended using additional weights. For example, if there are three joints, i (e.g., 108), j (e.g., 110), and k (not shown) that influence the location of point p in a surface representation, the displacement for joints (i, j), (i, k), and (j, k) are determined, and the results blended to determine a final displacement of for the location of point p in a surface representation. The displacement calculation can be expressed with the following formula:

$$\underline{d} = \sum_{(i,j) \in J(p)} W_{i,j} \underline{d}_{i,j}$$

where J(p) is the set of pairs of joints that influence the location of point p and the displacement $d_{i,j}$ and $W_{i,j}$ represents the weight applied to the displacement $d_{i,j}$. Typically, the greater the length of the displacement $d_{i,j}$, the greater the weight $W_{i,j}$. Moreover, the weight $W_{i,j}$ can be defined as:

$$W_{i,j} = \frac{\omega_{i,j}}{\sum_{(k,l) \in J(p)} \omega_{k,l}} \times (w_i + w_j)$$

where i, j, k, and l are joints in the set J(p), $w_i$ and $w_j$ represent weights associated with the linear influence of the location to point p, and $\omega_{i,j}$ can be defined by the following formula:

$$\omega_{i,j} = \|d_{i,j}\| \times \theta_{i,j} \times AGW_i \times AGW_j \times w_i \times w_j$$

where $\theta_{i,j}$ is the cylindrical interpolation rotation angle for the joint pair (i,j), $AGW_i$ is the cylindrical interpolation weight for joint i, and $AGW_j$ is the cylindrical interpolation weight for joint j. In general, the weights $AGW_i$ and $AGW_j$ are used to arbitrate the influences of the joints. Typically, the weights $AGW_i$ and $AGW_j$ are normalized so that they define relative cylindrical interpolation contributions between joints.

Moreover, the previously described formulas exhibit a variety of properties. For example, $\|d_{i,j}\| \times \theta_{i,j}$ enforces that a joint pair that has zero displacement vector or angle does not contribute to the interpolation effects (e.g., influencing the weighting of other pairs). In other words, the greater the angle, the greater the contribution on the interpolation effects. As another example, $w_i \times w_j$ enforces that a joint pair where either joint has no linear influence on the location of the point p in the surface representation does not contribute to the interpolated effects. As another example, $(w_i + w_j)$ can be used to scale a contribution of the interpolated effects to the blended result of the location of point p proportional to an amount of linear blending.

Figure 4:
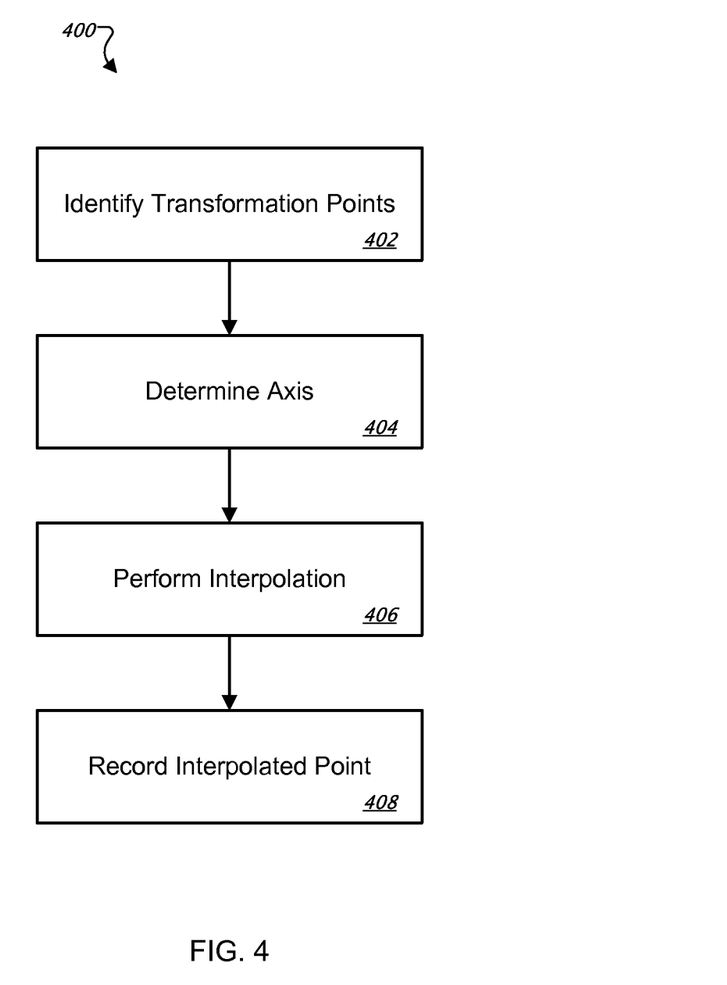
FIG. 4 is a flow chart of a method for generating a surface representation.

FIG. 4 is a flow chart illustrating a method 400 for generating a surface representation. The method 400 can be used to generate a surface representation for an item, such as a limb, or other three-dimensional representation. In general, the surface representation can be applied to three-dimensional geometry to display the influences of manipulating at least two joints associated with the three-dimensional geometry.

In step 402, at least first and second transformation points corresponding to respective first and second transformations of a point are identified. Each of the first and second transformations represents an influence on the location of the point respective to at least first and second joints associated with an item (e.g., a limb). For example, in reference to FIG. 3, the first transformation point Ap 302 and the second transformation point Bp 304 can be determined by evaluating the influence of the first transformation A and the second transformation B on point p. Typically, the first and second transformations A and B are associated with a first and second joint of a three-dimensional geometry, respectively. For example, in reference to FIG. 1, the first transformation A can be associated with the first joint 108 and the second transformation B can be associated with the second joint 110.

In step 404, an axis for a cylindrical coordinate system is identified. For example, a rigid transformation (R|t) can be approximated using the second transformation B and the inverse of the first transformation A (e.g., $BA^{-1}$). Moreover, the direction of the axis of the cylindrical coordinate system can be determined by identifying an invariant (e.g., eigenvector) of the rigid transformation. In addition, the origin of the axis of the cylindrical coordinate system can be estimated by determining a closest point on the axis to the origin of the cylindrical coordinate system. In some implementations, identifying the invariant is computed using a closed form formula (e.g., calculating the determinant of matrix R). Furthermore, in some implementations, identifying the origin of the axis is computed using a minimum norm solution (e.g., an SVD or pseudo-inverse calculation).

In step 406, an interpolation of the first and second transformation points is performed using a cylindrical coordinate system. For example, the origin, c, of the axis of the cylindrical coordinate system, u, can be used to generate a cylindrical coordinate system (c, $\bar{u}$, v, w). Moreover, the interpolation using the cylindrical coordinate system can be determined by evaluating formula (1) described in reference to FIG. 3.

In step 408, the interpolated point is recorded in a surface representation of the item. For example, the location of the interpolated point can be stored in memory and displayed in an animation process. The stored location can be used to modify a representation of a surface representation in at least a portion of three-dimensional geometry. For example, the location of the interpolated point can be displayed on a monitor or other display device to represent visually a change in an in-game or an in-movie representation of three-dimensional geometry.

One or more other steps can be performed before, in between and/or after the illustrated steps in some implementations.

Figure 5:
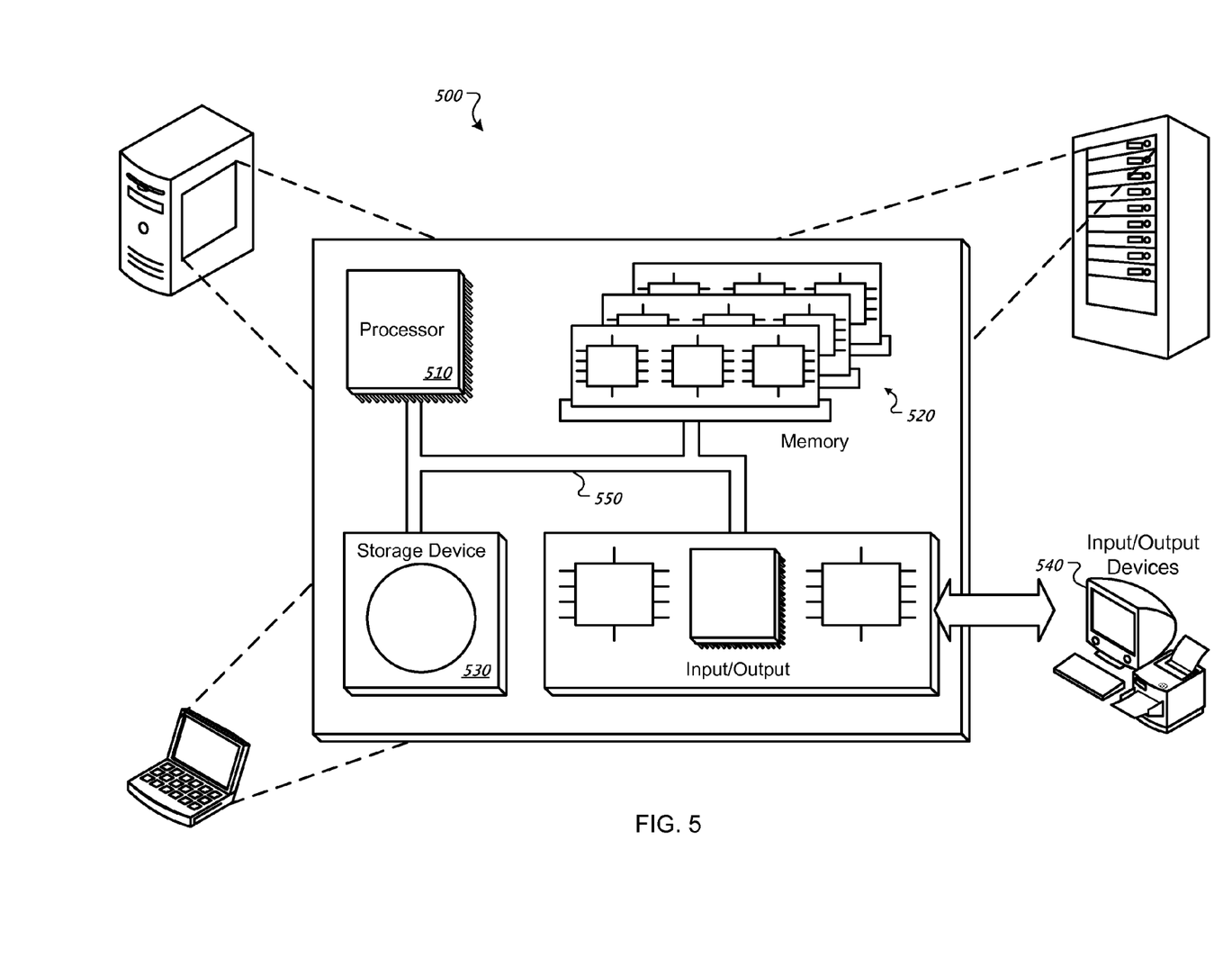
FIG. 5 is a schematic diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method comprising:
   identifying, using a computer system, for a point on an item in an animation process, at least first and second transformation points corresponding to respective first and second transformations of the point, each of the first and second transformations representing an influence on a location of the point of respective first and second joints associated with the item;
   determining, using the computer system, an axis for a cylindrical coordinate system, in part by estimating a third transformation that is a product of an inverse of the first transformation multiplied by the second transformation;
   performing, using the computer system, an interpolation of the first and second transformation points in the cylindrical coordinate system to obtain an interpolated point;
   recording, using the computer system, the interpolated point as a location of the point when the first and second transformations are applied to the point;
   generating a surface representation of the item, the surface representation including the recorded interpolated point; and
   generating an image of the item based on the generated surface representation.

2. The computer-implemented method of claim 1, wherein determining the axis comprises:
   estimating a composite effect of the first and second transformations.

3. The computer-implemented method of claim 2, wherein the estimation comprises:
   determining a rigid transformation as an approximation of: (i) the second transformation, and (ii) an inverse of the first transformation, wherein the rigid transformation is used in determining the axis.

4. The computer-implemented method of claim 3, wherein determining the axis further comprises:
determining a direction of the axis by identifying an invariant of the rigid transformation.

5. The computer-implemented method of claim 4, wherein the invariant is identified using a closed form formula.

6. The computer-implemented method of claim 4, wherein determining the axis further comprises:
estimating a point on the axis.

7. The computer-implemented method of claim 6, wherein estimating the point comprises:
determining a closest point on the axis to an origin.

8. The computer-implemented method of claim 7, wherein determining the closest point comprises:
computing a minimum norm solution.

9. The computer-implemented method of claim 1, wherein performing the interpolation comprises evaluating:

$$Env(p)=c+(\alpha lA+\beta lB)u+(\alpha rA+\beta rA)(\cos(\alpha\phi A+\beta\phi A)u+\sin(\alpha\phi A+\beta\phi A)w)$$

wherein
c is an origin of the cylindrical coordinate system
α is a blending weight for the first transformation
β is a blending weight for the second transformation
u is the axis of the cylindrical coordinate system
lA is a coordinate along the axis for the first transformation
lB is a coordinate along the axis for the second transformation
rA is a coordinate perpendicular to the axis for the first transformation
rB is a coordinate perpendicular to the axis for the second transformation
φA is an angle between lA and rA around the axis for the first transformation
φB is an angle between lB and rB around the axis for the second transformation
w is perpendicular to the axis.

10. The computer-implemented method of claim 1, further comprising blending (i) the interpolated point with (ii) a linear blending of the first and second transformations.

11. The computer-implemented method of claim 10, wherein the blending comprises evaluating a difference vector (d) as:

$$\underline{d} = aOn_i \times aOn_j \times \left(Env(p) - \frac{LinEnv(p)}{w_i + w_j}\right)$$

wherein
$w_i$ is a linear blending weight for joint i
$w_j$ is a linear blending weight for joint j
$aOn_i$ is an amount of cylindrical interpolation for joint i
$aOn_j$ is an amount of cylindrical interpolation for joint j.

12. The computer-implemented method of claim 10, wherein the point on the item is affected by more than two joints, including the first and second joints, and wherein the blending further comprises:
repeating the transformation points identification, the axis determination and the interpolation performance for each of the more than two joints; and
obtaining a blended result thereof using weights.

13. The computer-implemented method of claim 12, wherein obtaining the blended result includes:
enforcing that any joint pair that has zero displacement vector or angle does not make any contribution to the interpolated effects.

14. The computer-implemented method of claim 12, wherein obtaining the blended result includes:
enforcing that any joint pair where either joint has no linear influence on the point in the item does not make any contribution to the interpolated effects.

15. The computer-implemented method of claim 12, wherein obtaining the blended result includes:
scaling a contribution of the interpolated effects to the blended result proportional to an amount of linear blending.

16. The computer-implemented method of claim 12, wherein the blended result is obtained by evaluating:

$$\underline{d} = \sum_{(i,j) \in J(p)} W_{i,j} d_{i,j}$$

wherein $$W_{i,j} = \frac{\omega_{i,j}}{\sum_{(k,l) \in J(p)} \omega_{k,l}} \times (w_i + w_j)$$

$$\omega_{i,j} = \|d_{i,j}\| \times \theta_{i,j} \times AGW_i \times AGW_j \times w_i \times w_j$$

wherein
$AGW_i$ is a weight for joint i
$AGW_j$ is a weight for joint j.

17. A computer program product embodied in a non-transitory computer-readable medium and comprising instructions that when executed by a processor perform a method for generating a surface representation of an item, the method comprising:
identifying, using a computer system, for a point on an item in an animation process, at least first and second transformation points corresponding to respective first and second transformations of the point, each of the first and second transformations representing an influence on a location of the point of respective first and second joints associated with the item;
determining, using the computer system, an axis for a cylindrical coordinate system, in part by estimating a third transformation that is a product of an inverse of the first transformation multiplied by the second transformation;
performing, using the computer system, an interpolation of the first and second transformation points in the cylindrical coordinate system to obtain an interpolated point;
recording, using the computer system, the interpolated point as a location of the point when the first and second transformations are applied to the point;
generating a surface representation of the item, the surface representation including the recorded interpolated point; and
generating an image of the item based on the generated surface representation.

18. A system comprising:
one or more processors; and
a computer program product embodied in a non-transitory computer-readable medium and comprising instructions that when executed by a processor perform a method for generating a surface representation of an item, the method comprising:
identifying, using a computer system, for a point on an item in an animation process, at least first and second transformation points corresponding to respective first and second transformations of the point, each of the first and second transformations representing an influence on a location of the point of respective first and second joints associated with the item;

determining, using the computer system, an axis for a cylindrical coordinate system, in part by estimating a third transformation that is a product of an inverse of the first transformation multiplied by the second transformation;

performing, using the computer system, an interpolation of the first and second transformation points in the cylindrical coordinate system to obtain an interpolated point;

recording, using the computer system, the interpolated point as a location of the point when the first and second transformations are applied to the point;

generating a surface representation of the item, the surface representation including the recorded interpolated point; and generating an image of the item based on the generated surface representation.

* * * * *

UNITED STATES PATENT AND TRADEMARK OFFICE
CERTIFICATE OF CORRECTION

PATENT NO. : 8,416,246 B2  
APPLICATION NO. : 13/467428  
DATED : April 9, 2013  
INVENTOR(S) : Jason Smith et al.

Page 1 of 1

It is certified that error appears in the above-identified patent and that said Letters Patent is hereby corrected as shown below:

In the Specifications Section,
Image 1 on page 8, column 5, line 3, delete

"$$\alpha A+\beta B=\begin{bmatrix} 1 & 0 & 0 & \beta \\ 0 & \alpha+cos\theta & \beta sin\theta & 0 \\ 0 & -\beta sin\theta & a+\beta cos\theta & 0 \end{bmatrix}$$", and insert --$$\alpha A+\beta B=\begin{bmatrix} 1 & 0 & 0 & \beta \\ 0 & \alpha+\beta cos\theta & \beta sin\theta & 0 \\ 0 & -\beta sin\theta & a+\beta cos\theta & 0 \end{bmatrix}$$--

Signed and Sealed this
Thirteenth Day of August, 2013

Teresa Stanek Rea
*Acting Director of the United States Patent and Trademark Office*